United States Patent
Kao et al.

(10) Patent No.: US 9,569,888 B2
(45) Date of Patent: Feb. 14, 2017

(54) DEPTH INFORMATION-BASED MODELING METHOD, GRAPHIC PROCESSING APPARATUS AND STORAGE MEDIUM

(71) Applicant: Industrial Technology Research Institute, Hsinchu (TW)

(72) Inventors: Jung-Yang Kao, Pingtung County (TW); Wei-Shuo Li, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 86 days.

(21) Appl. No.: 14/672,236

(22) Filed: Mar. 30, 2015

(65) Prior Publication Data
US 2016/0171759 A1    Jun. 16, 2016

(30) Foreign Application Priority Data
Dec. 15, 2014    (TW) .............................. 103143656 A (51) Int. Cl.
*G06T 17/20* (2006.01)
*G06T 15/04* (2011.01)
(Continued)

(52) U.S. Cl.
CPC ................. *G06T 17/20* (2013.01); *G06T 1/20* (2013.01); *G06T 15/04* (2013.01); *G06T 15/10* (2013.01); *G06T 2200/28* (2013.01)

(58) Field of Classification Search
CPC ............ G06T 17/20; G06T 15/10; G06T 1/20; G06T 15/04; G06T 2200/28
See application file for complete search history.

(56) References Cited

U.S. PATENT DOCUMENTS

| 6,982,710 B2 | 1/2006 | Salomie |
| 7,257,249 B2 | 8/2007 | Farsaie |

(Continued)

FOREIGN PATENT DOCUMENTS

| CN | 101082988 | 12/2007 |
| CN | 101110126 | 1/2008 |

(Continued)

OTHER PUBLICATIONS

Kobbelt, Feature Sensitive Surface Extraction from Volume Data, Proceeding SIGGRAPH '01 Proceedings of the 28th annual conference on Computer graphics and interactive techniques pp. 57-66.*

(Continued)

*Primary Examiner* — Tapas Mazumder
(74) *Attorney, Agent, or Firm* — Jianq Chyun IP Office (57) ABSTRACT

A depth information-based modeling method, a graphic processing apparatus and a storage medium are provided. The depth information-based modeling method includes receiving a plurality of depth image data, each of which has depth information, and a plurality of color images, each of which color information. In the method, a plurality of 3D grids is obtained according to the color information, depth information and a plurality of uniform sampling grids. Each of the uniform sampling grids is further divided into a plurality of sub-grids. At least one point on each of the 3D grids is determined by the depth information, and the triangle meshes are generated according to the points.

10 Claims, 9 Drawing Sheets

(51) Int. Cl.
*G06T 1/20* (2006.01)
*G06T 15/10* (2011.01)

(56) References Cited

U.S. PATENT DOCUMENTS

| | | |
|---|---|---|
| 2005/0140670 A1 | 6/2005 | Wu et al. |
| 2006/0152507 A1* | 7/2006 | Lee .................. G06T 15/10 345/423 |
| 2006/0176297 A1 | 8/2006 | Kim et al. |
| 2006/0290695 A1 | 12/2006 | Salomie |
| 2007/0206006 A1* | 9/2007 | Lee .................. G06T 17/005 345/420 |
| 2009/0109129 A1 | 4/2009 | Cheong et al. |
| 2013/0106852 A1 | 5/2013 | Woodhouse et al. |
| 2015/0229966 A1* | 8/2015 | Choe ................. H04N 19/597 348/43 |

FOREIGN PATENT DOCUMENTS

| | | |
|---|---|---|
| CN | 102831648 | 12/2012 |
| EP | 1221674 | 7/2002 |
| TW | 201025186 | 7/2010 |

OTHER PUBLICATIONS

"Notice of Allowance of Taiwan Counterpart Application," issued on Jan. 30, 2016, p. 1-p. 3.

Wan et al., "Precision enhancement of 3D surfaces from multiple quantized depth maps," IEEE 11th IVMSP Workshop, Jun. 10-12, 2013, pp. 1-4.

Song et al., "3D mesh and multi-view synthesis implementation using stereo cameras and a depth camera," 3DTV-Conference: The True Vision-Capture, Transmission and Dispaly of 3D Video (3DTV-CON), Oct. 7-8, 2013, pp. 1-3.

Muller et al., "3-D Video Representation Using Depth Maps," Proceedings of the IEEE, Apr. 2011, pp. 643-656.

Ma et al., "3D Colored Model Generation Based on Multiview Textures and Triangular Mesh," Seventh International Conference on Distributed Smart Cameras (ICDSC), Oct. 29-Nov. 1, 2013, pp. 1-6.

Varadarajan et al., "Real-time depth diffusion for 3D surface reconstruction," Proceedings of 2010 IEEE 17th International Conference on Image Processing, Sep. 26-29, 2010, pp. 4149-4152.

Jin et al., "An Improved Marching Cubes Method for Surface Reconstruction of Volume Data," The Sixth World Congress on Intelligent Control and Automation, Jun. 21-23, 2006, pp. 10454-10457.

\* cited by examiner

DEPTH INFORMATION-BASED MODELING METHOD, GRAPHIC PROCESSING APPARATUS AND STORAGE MEDIUM

CROSS-REFERENCE TO RELATED APPLICATION

This application claims the priority benefit of Taiwan application no. 103143656, filed on Dec. 15, 2014. The entirety of the above-mentioned patent application is hereby incorporated by reference herein and made a part of this specification.

TECHNICAL FIELD

The present disclosure relates to a modeling method, an apparatus and a storage medium, and more particularly, relates to a depth information-based modeling method, a graphic processing apparatus and a storage medium.

BACKGROUND

With advancement in the computer graphics, 3D modeling methods have been widely applied in computers, scientific researches or multimedia systems. A 3D model is represented by a 3D polygon of an object, usually displayed by a computer or a video player, and commonly seen in a computer game, a 3D film, a 3D television, an autostereoscopic 3D display and the like.

In one of the 3D modeling methods, software is generally used to generate the 3D model (nonetheless, it can also be generated by other methods). This method is characterized by its easy interaction with users mainly because it constructs meshes for the 3D model by locating a plurality of feature points and constructs the model by a surface reconstruction. However, such method provides poor effects in terms of realness, dynamic, light, texture and the like, and has difficulties in performing a rendering in real-time due to large amount of computation loads for the feature points and the meshes.

In another one of the 3D modeling methods, a Multiview Video Coding (MVC) is mainly used to achieve a 3D effective by a view synthesis of video and depth information. Because an image extracted by such method is a physical image, a more preferable realness can be provided. Further, the extracted image may be used to generate non-extracted parts by the view synthesis, and a computational process thereof is relatively easier for the rendering to be performed in real-time. Nonetheless, operations of zoom-in and zoom-out are prone to distortion since the depth information is non-linear.

Because application of the 3D model often involves frequent interaction with users, it is an important issue to be solved by person skilled in the art as how to perform the rendering for the 3D model of a free-view object with high resolution in real-time while maintaining favorable displaying effect thereof.

SUMMARY

In one of exemplary examples according to the present disclosure, a depth information-based modeling method adapted to a graphic processing apparatus is provided. In this method, depth image data including depth information and color image data including color information are received. A plurality of 3D grids is obtained according to the depth information, the color information, and a plurality of uniform sampling grids. Each of the uniform sampling grids is further divided into a plurality of sub-grids. At least one point on edges of each of the 3D grids is determined according to the depth information corresponding to each of the edges of the 3D grids. At least two triangle meshes are generated for the corresponding sub-grid according to the points.

In one of exemplary examples according to the present disclosure, a graphic processing apparatus is provided, which includes an executive circuit and a temporary storage device. The temporary storage device is configured to store depth image data including depth information and color image data including color information. The executive circuit is configured to receive the depth image data and the color image data, and obtain a plurality of 3D grids according to the depth information, the color information, and a plurality of uniform sampling grids. Each of the uniform sampling grids is further divided into a plurality of sub-grids, and the sub-grids may have varying sizes. At least one point on edges of each of the 3D grids is determined according to the depth information corresponding to each of the edges of the 3D grids. At least two triangle meshes are generated for the corresponding 3D grid according to the points.

In one of exemplary examples according to the present disclosure, a non-transitory computer readable recording medium stored with a program is provided, and aforesaid methods may be completed after the program is loaded into a computer and is executed.

Based on the above, the present disclosure combines the traditional 3D modeling method together with the depth information-based modeling method to achieve a quick 3D modeling.

To make the above features of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure proposes exemplary examples of a depth information-based modeling method, a graphic processing apparatus and a storage medium, which may be implemented into any type of handheld apparatuses, computer systems, or computer readable mediums served as a computer program product.

The present disclosure proposes exemplary examples of a depth information-based modeling method, a graphic processing apparatus and a storage medium, which may be used in a combination of one or more computer usable or readable memory storage mediums. For example, specific embodiments of the computer readable medium may include an electrical connection composed of one or more connecting lines, a portable computer disk, a hard disk drive, a random access memory (RAM), a read only memory (ROM), an erasable programmable read only memory (EPROM or a flash memory), an optical fiber, a portable CD-ROM, an optical storage device, a transmission medium (underlying connection to Internet or Intranet), or a magnetic storage device.

Figure 1:
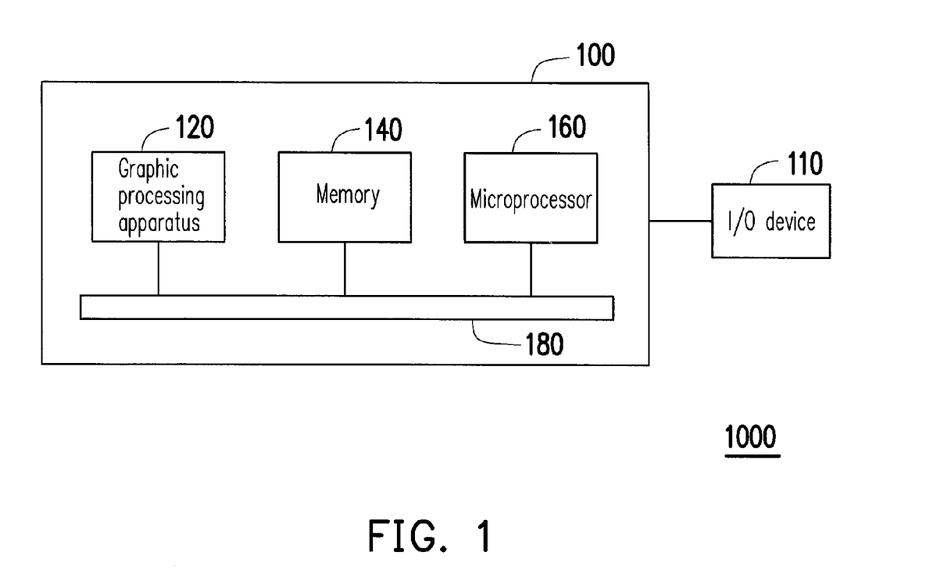
FIG. 1 illustrates a schematic diagram of a host system and a graphic processing apparatus according to an embodiment of the present disclosure.

FIG. 1 illustrates a schematic diagram of a host system and a graphic processing apparatus according to one of many embodiments of the present disclosure. Referring to FIG. 1, a host system 1000 of this embodiment generally includes a host 100 and an input/output (I/O) device 110. The host 100 includes a graphic processing apparatus 120, a memory 140 and a microprocessor 160, which are electrically connected to one another through a bus 180. It should be understood that, FIG. 1 is not intended to limit the host system, which may further include other devices.

In the embodiments of the present disclosure, the input/output device 110 is electrically connected to the host 100, and capable of writing input data into the memory 140 through operations of the microprocessor 160 for the graphic processing apparatus 120 to read and calculate. The memory 140 may be a static random access memory (SRAM), a dynamic random access memory (DRAM), or any memory or storage device capable of storing electronic signals or data. Further, as mentioned in the present embodiment, the input device may be a device capable of receiving digital images, such as a common digital or a video recorder; and the output device may be a common computer screen or any display device capable of outputting images for users. In the present exemplary embodiment, the input/output device 110 is an input and output device compatible with the Serial Advanced Technology Attachment (SATA) standard and supporting the MVC standard for receiving the depth information. However, it should be understood that the present disclosure is not limited thereto. The input/output device 110 may also be compatible with the Institute of Electrical and Electronic Engineers (IEEE) 1394 standard, the Peripheral Component Interconnect (PCI) interface standard, the Universal Serial Bus (USB) interface standard, the Secure Digital (SD) interface standard, the Memory Stick (MS) interface standard, the Multi Media Card (MMC) interface standard, the Compact Flash (CF) interface standard, the Integrated Drive Electronics (IDE) interface standard or other suitable data transmission standards, and may cooperate with any devices capable of inputting the depth information (e.g., devices supporting the MVC standard or the Kinect depth sensing device of Microsoft).

In general, the host system 1000 may substantially receive an input image data by the input/output device 110. The input image data may be, for example, depth image data including depth information and color image data including color information. The microprocessor 160 receives the input image data and stores the input image data into the memory 140. The graphic processing apparatus 120 obtains the input image data from the memory 140 for a calculation and outputs an output image being calculated to the memory 140. The details regarding a three-dimensional (3D) modeling method for the calculation are described hereinafter. The microprocessor 160 then transmits the output image to the input/output device 110 for outputting images. Although the host system 1000 is illustrated as a computer system in the present embodiment for example, in another embodiment, the host system 1000 may also be a system such as a digital camera, a video camera, a telecommunication device, a video player or the like.

The graphic processing apparatus 120 includes an executive circuit 230. In the present exemplary embodiment, the executive circuit 230 is implemented by the Application-Specific Integrated Circuit (ASIC, or known as the application specific IC) to execute all or part of steps in each embodiment of the present disclosure. However, in another embodiment, the executive circuit may also be implemented by a processing unit.

Figure 2:
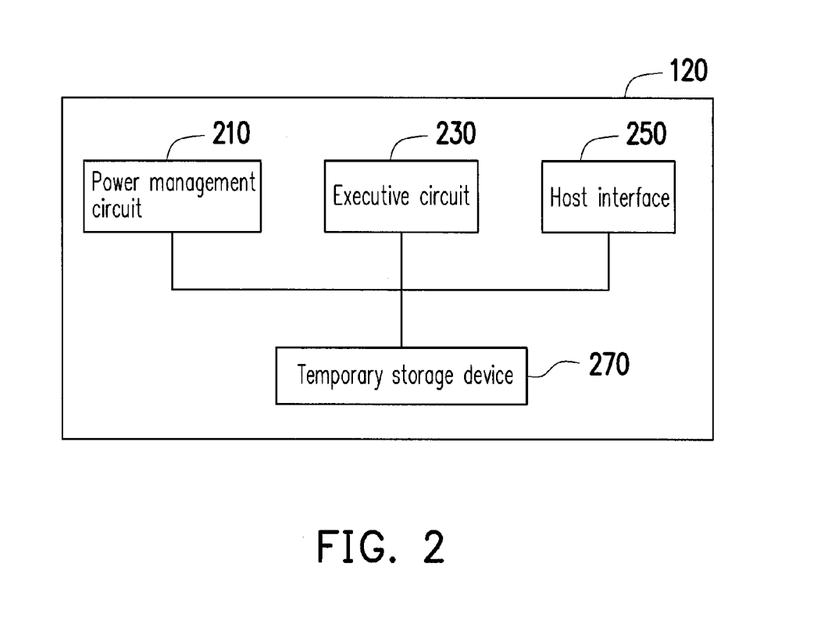
FIG. 2 illustrates a schematic diagram of the graphic processing apparatus depicted in FIG. 1.

FIG. 2 illustrates a schematic diagram of the graphic processing apparatus according to one of many embodiments as depicted in FIG. 1.

Referring to FIG. 2, the graphic processing apparatus 120 of the present embodiment is configured to execute a plurality of logic gates or control commands implemented in a hardware form or in a firmware form, and a 3D modeling method may be performed for the input image data by the graphic processing apparatus 120 according to commands from the host 100. The graphic processing apparatus 120 includes a power management circuit 210, the executive circuit 230, a host interface 250 and a temporary storage device 270. The host interface 250 is electrically connected to the executive circuit 230, the temporary storage device 270 and the host 100, and configured to receive and identify commands and data transmitted from the microprocessor 160 and the memory 140. In other words, the commands and the data transmitted from the microprocessor 160 and the memory 140 are transmitted to the executive circuit 230 and the temporary storage device 270 by the host interface 250. In the present exemplary embodiment, the host interface 250 is compatible with the SATA standard. However, it should be understood that the present disclosure is not limited thereto. The host interface 250 may also be compatible with the PATA standard, the IEEE 1394 standard, the PCI Express standard, the USB standard, the SD standard, the MS standard, the MMC standard, the CF standard, the IDE standard, or other suitable data transmission standards. The temporary storage device 270 may be a SRAM, a DRAM, or any memory or storage device capable of storing electronic signals or data. In addition, the power management circuit 210 is responsible for supplying power required by each unit in the graphic processing apparatus 120.

The executive circuit 230 is configured to control an overall operation of the graphic processing apparatus 120. Specifically, the executive circuit 230 includes a plurality of control commands, and the control commands are executed during operations of the graphic processing apparatus 120. The executive circuit 230 first receives an input image from the host interface 250 and the stores the input image into the temporary storage device 270, and then reads the input image data from the temporary storage device 270. The input image data may comprise depth image data including the depth information and color image data including the color information, which are used to construct a 3D model according to the 3D modeling method of the present disclosure. The 3D modeling method is described in detail later in FIGS. 3A to 3B, FIGS. 4A to 4D and FIGS. 5A to 5D. Further, the constructed 3D model is then outputted to the temporary storage device 270 and waited to be transmitted to the host 100 by the host interface 250.

In another exemplary embodiment, the executive circuit 230 may be a processing unit, which includes commands implemented in a firmware form. For example, the executive circuit 230 has a microprocessor unit (not illustrated) and a read only memory (not illustrated), and the control commands are burned into the read only memory. During operations of the executive device 230, the control commands are executed by the microprocessor unit in order to complete the 3D modeling method according to the exemplary embodiments of the present disclosure.

Figure 3A:
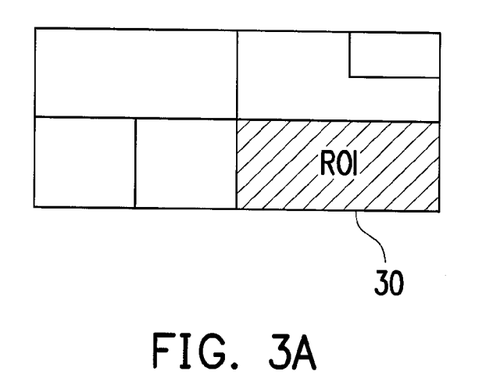
FIG. 3A to FIG. 3C illustrate schematic diagrams for dividing the sub-grids based on the variance of the region of interest according to an embodiment of the present disclosure.
Figure 3B:
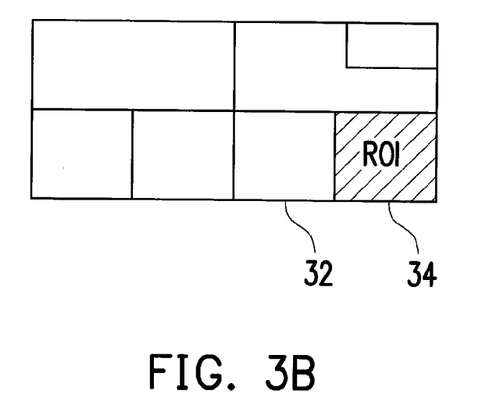
Figure 3C:
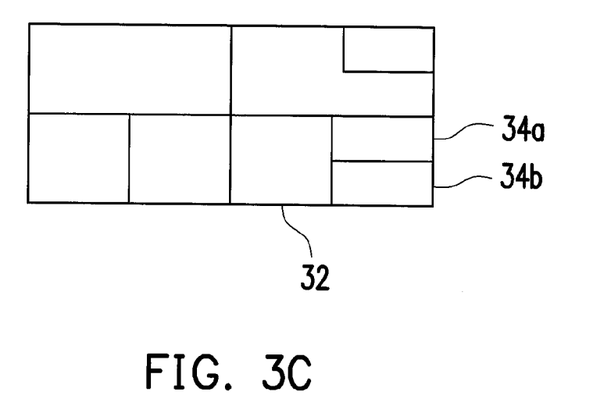

FIG. 3A to FIG. 3C illustrate schematic diagrams for dividing the sub-grids based on the variance of the region of interest according to an embodiment of the present disclosure.

When the executive circuit 230 receives an input image, the input image data may include depth image data including the depth information and color image data including the color information, and a plurality of preset uniform sampling grids may be configured to be corresponding to the color information. A variance of a region of interest (ROI) of the color information in the uniform sampling grid is calculated and compared with a preset threshold. If the variance of the region of interest is greater than the preset threshold, the corresponding uniform sampling grid is further divided into a plurality of sub-grids, and the sub-grids may have varying sizes. The variance of the region of interest refers to a degree of dispersion of the color information in the uniform sampling grid, which can be obtained according to a discrete mathematic formula or calculated according to a variation degree of colors by person skilled in the art, but the present disclosure is not limited thereto. The variance of a region of interest of each of the sub-grids is determined by the corresponding color information. In one case if the variance of the region of interest is greater than a threshold, the corresponding sub-grids are further divided until the variance of the region of interest variance of each of the sub-grids is lower than the threshold.

Referring FIG. 3A, which is a schematic diagram of an example for dividing one sub-grid. If the variance of the region of interest of a sub-grid 30 is greater than a preset threshold, the corresponding sub-grid 30 is then further divided. As a result, the sub-grid 30 is divided into a sub-grid 32 and a sub-grid 34, as shown in FIG. 3B. Further, if the variance of the region of interest of the sub-grid 34 is greater than the threshold, the corresponding sub-grid 34 is further divided into a sub-grid 34a and a sub-grid 34b, so that the variance of the region of interest of each sub-grid in this uniform sampling grid is less than the threshold, as shown in FIG. 3C. It should be noted that, a method for dividing the sub-grids is not limited by the present embodiment. In one embodiment, the variance of a region of interest of each of the sub-grids is determined by the corresponding color information. If the variance of the region of interest is greater than a threshold, the corresponding sub-grids are further divided until the variance of the region of interest variance of each of the sub-grids is lower than the threshold.

Figure 4:
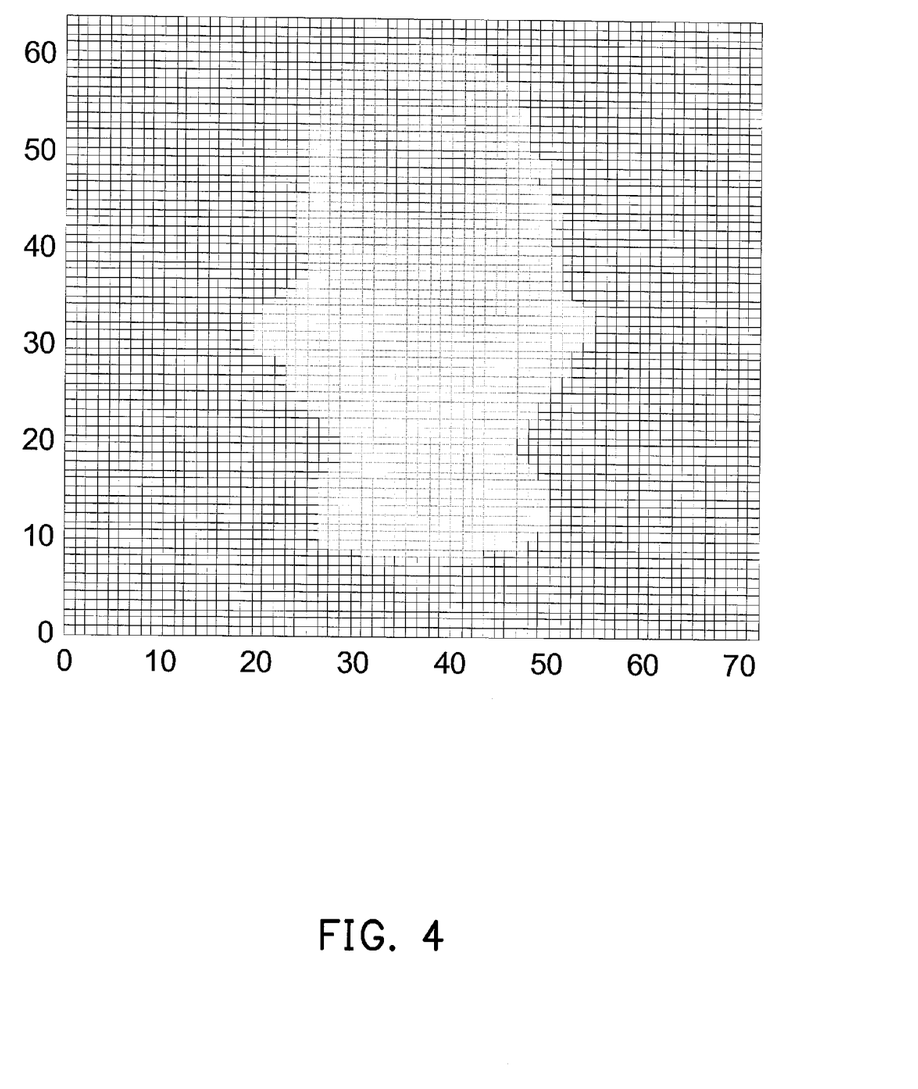
FIG. 4 illustrates a schematic diagram for projecting the uniform sampling grid onto a 2D space of the depth information of the depth image data according to an embodiment of the present disclosure.

FIG. 4 illustrates a schematic diagram for projecting the uniform sampling grid onto a 2D space of the depth information of the depth image data by a back projecting manner, for example, according to an embodiment of the present disclosure. When the variance of the region of interest of each of the sub-grids of the uniform sampling grids is less than the threshold, the corresponding uniform sampling grids being divided are projected onto the depth information of the depth image data.

Figure 5:
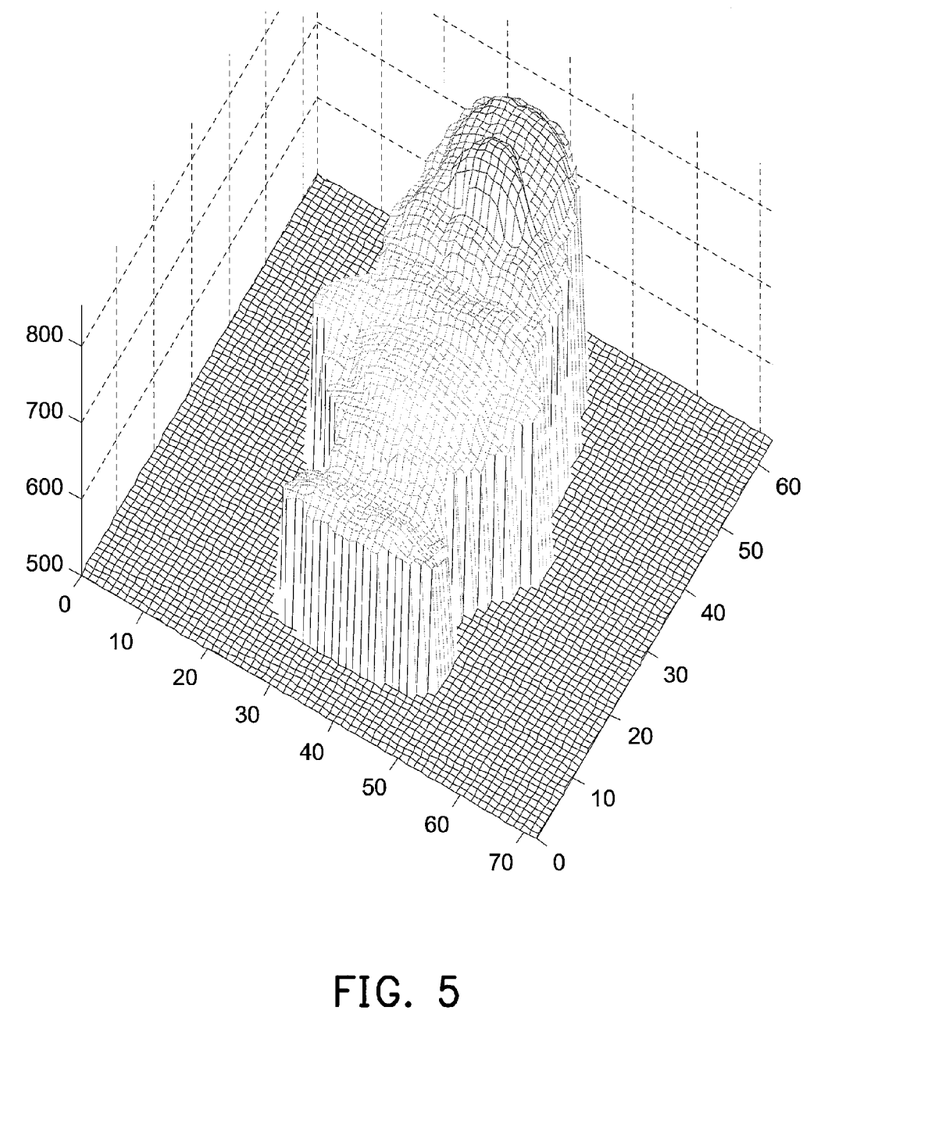
FIG. 5 illustrates a schematic diagram for projecting the uniform sampling grid onto a 3D space by a back-projection according to an embodiment of the present disclosure.

FIG. 5 illustrates a schematic diagram for projecting the uniform sampling grid onto a 3D space by a back-projection according to an embodiment of the present disclosure. After being projected onto the 2D space of the depth information of the depth image data, the uniform sampling grids are then projected onto the 3D space by the back-projection to become a plurality of 3D grids. Further, at least one point is determined according to the depth information corresponding to each edge of the 3D grids in order to generate at least two triangle meshes. In the present exemplary embodiment, at most two points respectively having or with the largest one and the second largest one among depth information values in the 3D grid are determined, and the sub-grids are divided according to strengths of these points, and the sub-grids may have varying sizes. A dividing method thereof is to connect a line from the point having or with the largest depth information value to the point having the second largest depth information value and/or other vertices not connected to the point having the largest depth information value, so as to generate the triangle meshes for the 3D grids. For clarity and better understanding of description, the method for generating the triangle meshes further described in the following embodiments.

FIGS. 6A to 6D are schematic diagrams illustrating an example for generating the triangle meshes by one edge of the 3D grid and the corresponding depth information according to an embodiment of the present disclosure.

Figure 6A:
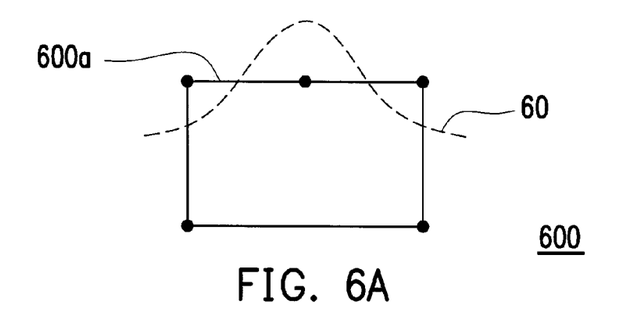
FIGS. 6A to 6D are schematic diagrams illustrating an example for generating the triangle meshes by one edge of the 3D grid and the corresponding depth information according to an embodiment of the present disclosure.
Figure 6B:
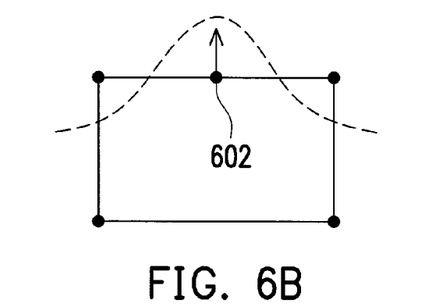
Figure 6C:
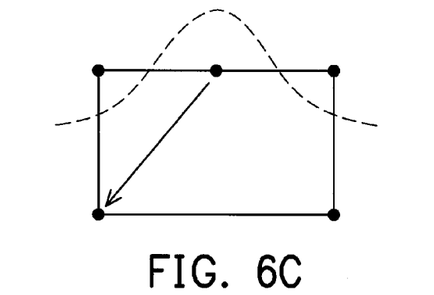
Figure 6D:
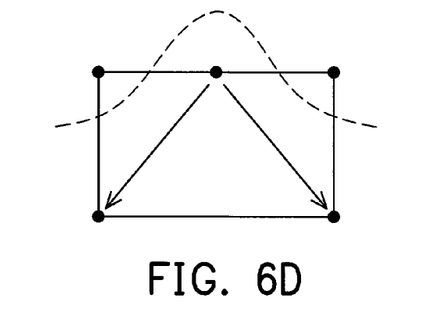

An example for generating the triangle meshes is, for example, as shown in FIGS. 6A to 6D. Referring to FIG. 6A, a dashed line 60 is corresponding to a size of the depth information value at an edge 600a of a 3D grid 600. As shown in FIG. 6B, a point 602 having a largest depth information value on the edge 600a is determined according to the size of the depth information value corresponding to the dashed line 60 on the edge 600a. In the case where the depth information values on other edges are equal to or less than the depth information value of the point 602, a line is connected from the point having the largest depth value to a vertex not connected to the point 602, as shown in FIG. 6C. A final result thereof is as shown by FIG. 6D, in which three triangle meshes are generated in this 3D grid.

FIGS. 7A to 7D illustrate schematic diagrams of examples for generating the triangle meshes by points selected based on the depth information for the 3D grid according to an embodiment of the present disclosure.

Figure 7A:
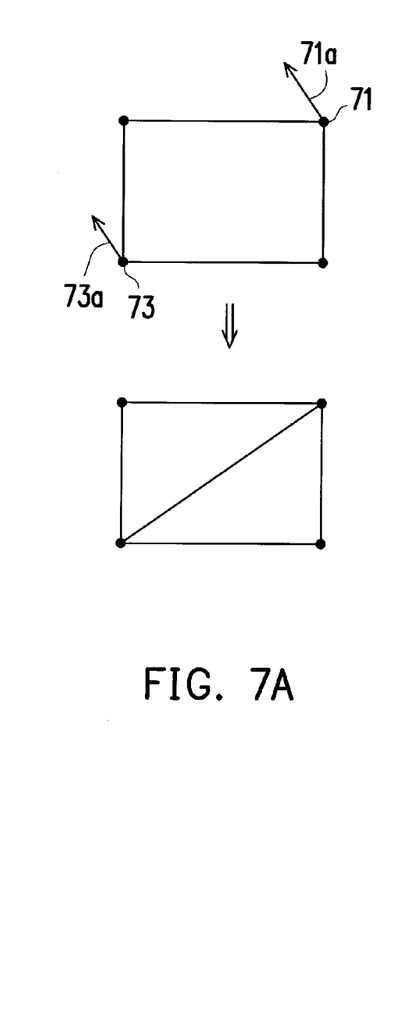
FIG. 7A illustrates a schematic diagram of an example for generating the triangle meshes by two vertices selected based on the depth information for the 3D grid according to an embodiment of the present disclosure.

As shown in FIGS. 7A to 7D, arrows 71a and 73a on points 71 and 73 each represents a depth information strength for the corresponding point. The point 71 is the point having the largest depth information value, and the point 73 is the point having the second largest depth information value. As shown in FIG. 7A, if the two largest depth information values of the 3D grid fall on vertices of the 3D grids, two triangle meshes may be formed for this 3D grid by connecting a line between aforesaid two points.

Figure 7B:
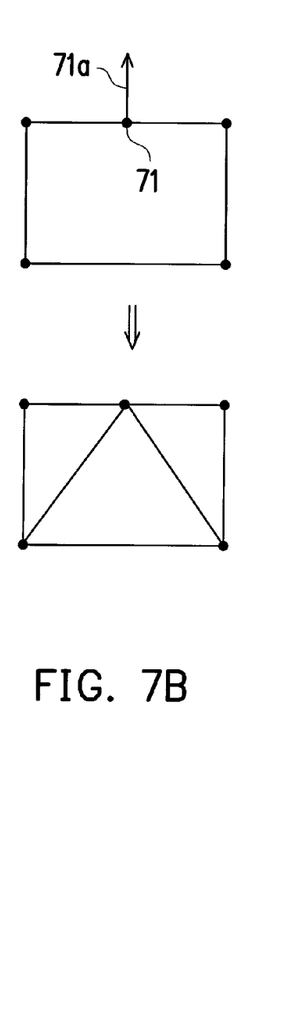
FIG. 7B illustrates a schematic diagram of an example for generating the triangle meshes by one point selected based on the depth information for the 3D grid according to an embodiment of the present disclosure.

In the case where only one point has the largest depth information value while the rest of depth information values are identical, only the point 71 having the largest depth information value is selected, as shown in FIG. 7B. Then, a line is connected from this point to each of two vertices of the 3D grid which are not connected to the point 71. As a result, three triangle meshes are generated for this 3D grid.

Figure 7C:
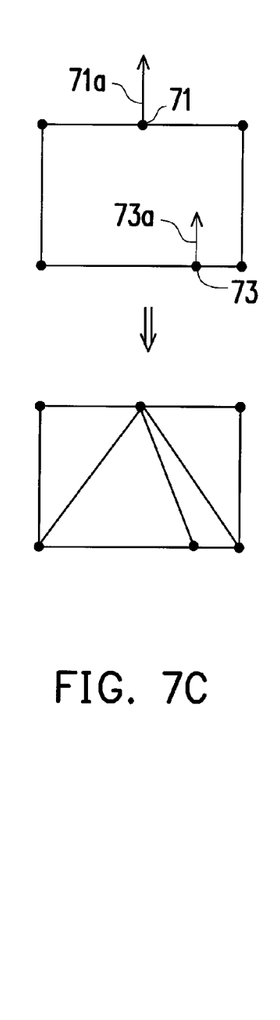
FIG. 7C illustrates a schematic diagram of an example for generating the triangle meshes by two points selected based on the depth information for the 3D grid according to an embodiment of the present disclosure.

In FIG. 7C, the point 71 having the largest depth information value and the point 73 having the second largest depth information value are selected, and a line is connected from the point 71 having the largest depth information value to each of the point 73 having the second largest depth information value and the vertices of the 3D grid which are not connected to the point 71. As a result, four triangle meshes are generated.

Figure 7D:
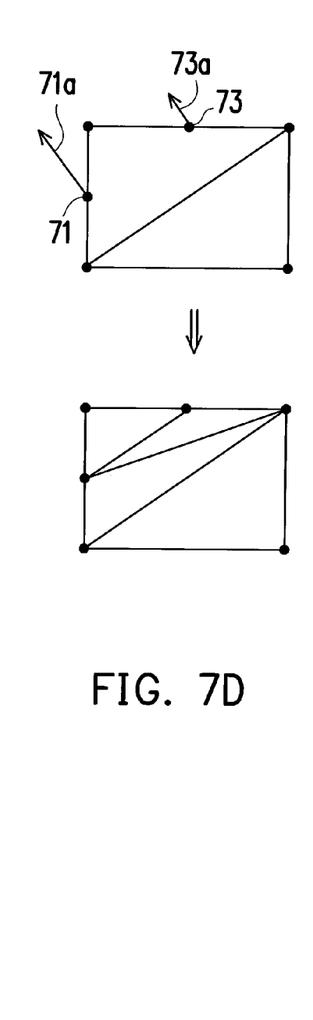
FIG. 7D illustrates a schematic diagram of an example for generating the triangle meshes by two points of adjacent edges selected based on the depth information for the 3D grid according to an embodiment of the present disclosure.

In FIG. 7D, the selected two points are located on adjacent edges. In this case, a line is first connected between the two vertices at across corners of the adjacent edges of the 3D grid, and then a line is connected from the point 71 having the largest depth information value to each of the point 73 having the second largest depth information value and one vertex which is not connected to the point 71. As a result, four triangle meshes are generated. The examples provided above are merely served for brief description instead of limiting the dividing method for the triangle meshes. The triangle meshes might with varying sizes.

Figure 8:
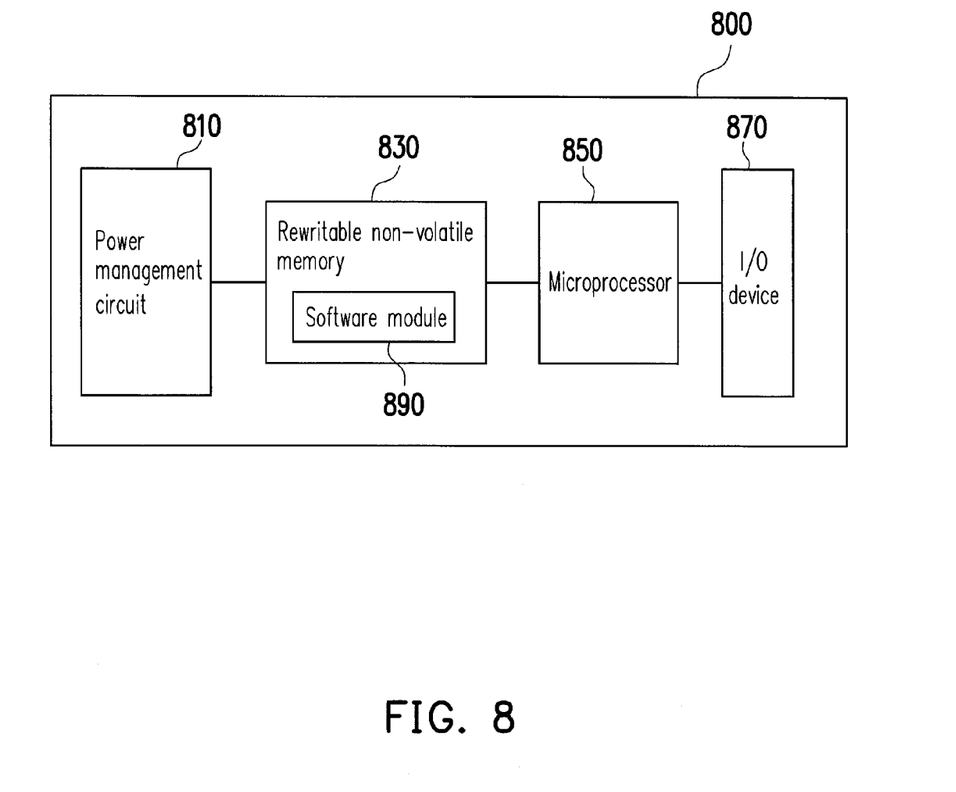
FIG. 8 illustrates a schematic diagram of a software module stored in a non-volatile storage medium according to an embodiment of the present disclosure.

FIG. 8 illustrates a schematic diagram of a software module stored in a non-volatile storage medium according to an embodiment of the present disclosure.

Referring to FIG. 8, a rewritable non-volatile storage medium 800 includes a power management circuit 810, a rewritable non-volatile memory 830 on which a software module 890 is executed, a microprocessor 850 and an input/output device 870, and each of said devices are electrically connected to one another. The power management circuit 810 is responsible for supplying power required by each unit in the rewritable non-volatile storage medium 800. Functions of the input/output device 870 are similar to those of the input/output device 110 of FIG. 1 in the foregoing embodiment, which are not repeated herein.

A depth information-based modeling method according another exemplary embodiment of the present disclosure may also be stored in form of the software module 890 stored in a specific area (e.g., a system area in the memory for storing system data) of the rewritable non-volatile memory 830. The rewritable non-volatile memory 830 may be a static random access memory (SRAM), a dynamic random access memory (DRAM), or any memory or storage device capable of storing electronic signals or data. When it is intended to construct one 3D model, the input/output device 870 first receives input depth image data and color image data. The depth image data includes depth information, and the color image data includes color information. The microprocessor 850 stores the depth image data into the rewritable non-volatile memory 830. The microprocessor 850 executes commands of the software module 890 on the rewritable non-volatile memory 830. The commands are used to execute the 3D modeling method according to the exemplary embodiments of the present disclosure. The 3D modeling method has been provided in the foregoing description, and the constructed 3D model may be temporarily stored into the rewritable non-volatile memory 830. Thereafter, the microprocessor 850 outputs the constructed 3D model from the rewritable non-volatile memory 830 via the input/output device 870 to users.

It should be understood that, FIG. 8 is not intended to limit the devices disposed on the rewritable non-volatile storage medium 800, which may further include other devices. Instead of being limited to the structure of the rewritable non-volatile storage medium 800 illustrated in the present embodiment, the rewritable non-volatile storage medium 800 may also be a system having the rewritable non-volatile storage medium, such as a digital camera, a video camera, a telecommunication device, a video player or the like.

Figure 9:
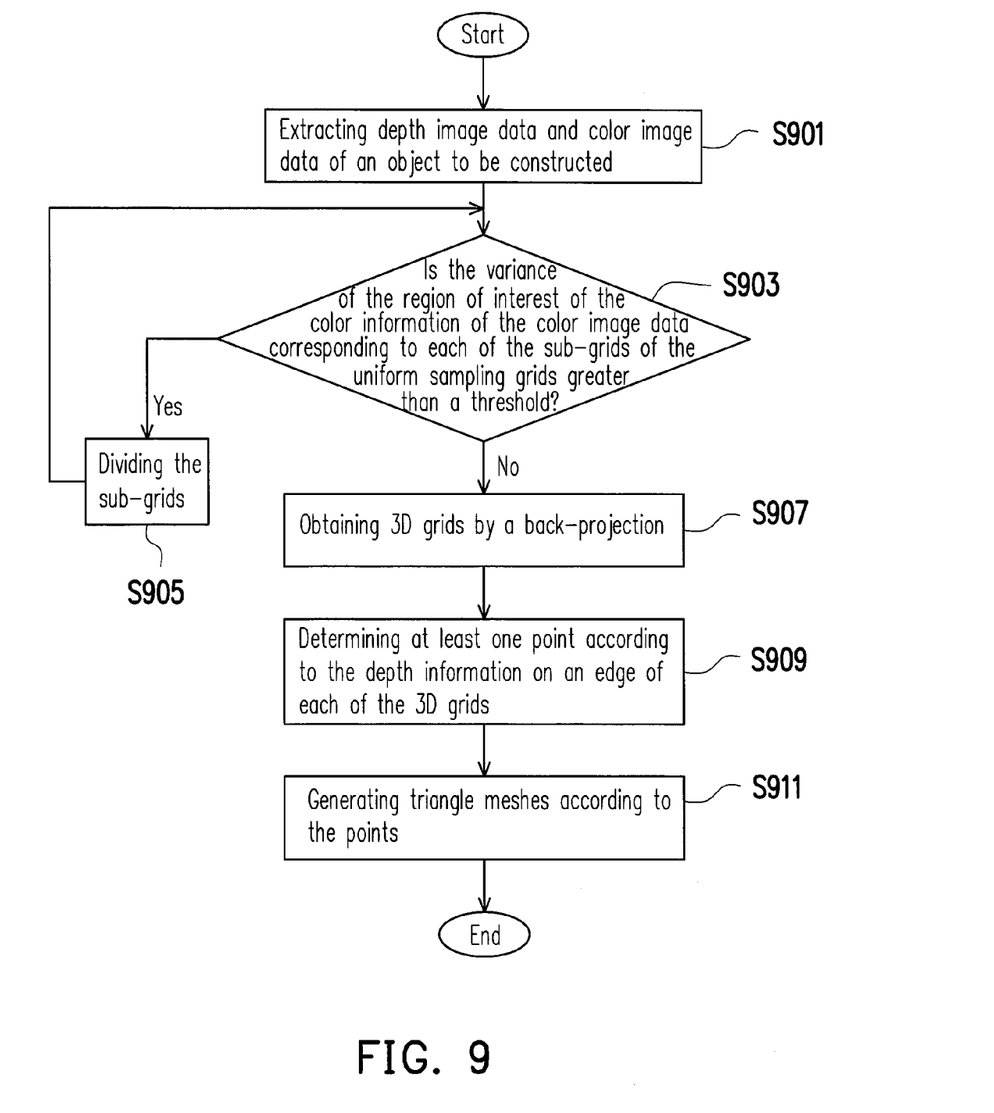
FIG. 9 illustrates a schematic diagram of a depth information-based modeling method according to an exemplary example of the present disclosure.

FIG. 9 illustrates a schematic diagram of a depth information-based modeling method according to an exemplary example of the present disclosure.

As shown in FIG. 9, when it is intended to construct a 3D model according to depth information, step S901 is first executed to extract depth image data and color image data of an object to be constructed. The depth image data includes depth information, and the color image data includes color information. Next, in step S903, whether the variance of the region of interest is greater than a threshold is determined according to the color information corresponding to the sub-grids of each of the uniform sampling grids. If yes, step S905 is executed to divide the sub-grids, and the step S903 is repeatedly executed until the variance of the region of interest of each of the sub-grids is less than the threshold. If the variance of the region of interest of each of the sub-grids is less than the threshold, step S907 is executed to obtain a plurality of 3D grids by a back-projection. Then, step S909 is executed to determine at least one point for each of 3D grids according to the depth information corresponding to each of edges of each of the 3D grids. In step S911, triangle meshes are generated according to the points.

Figure 10:
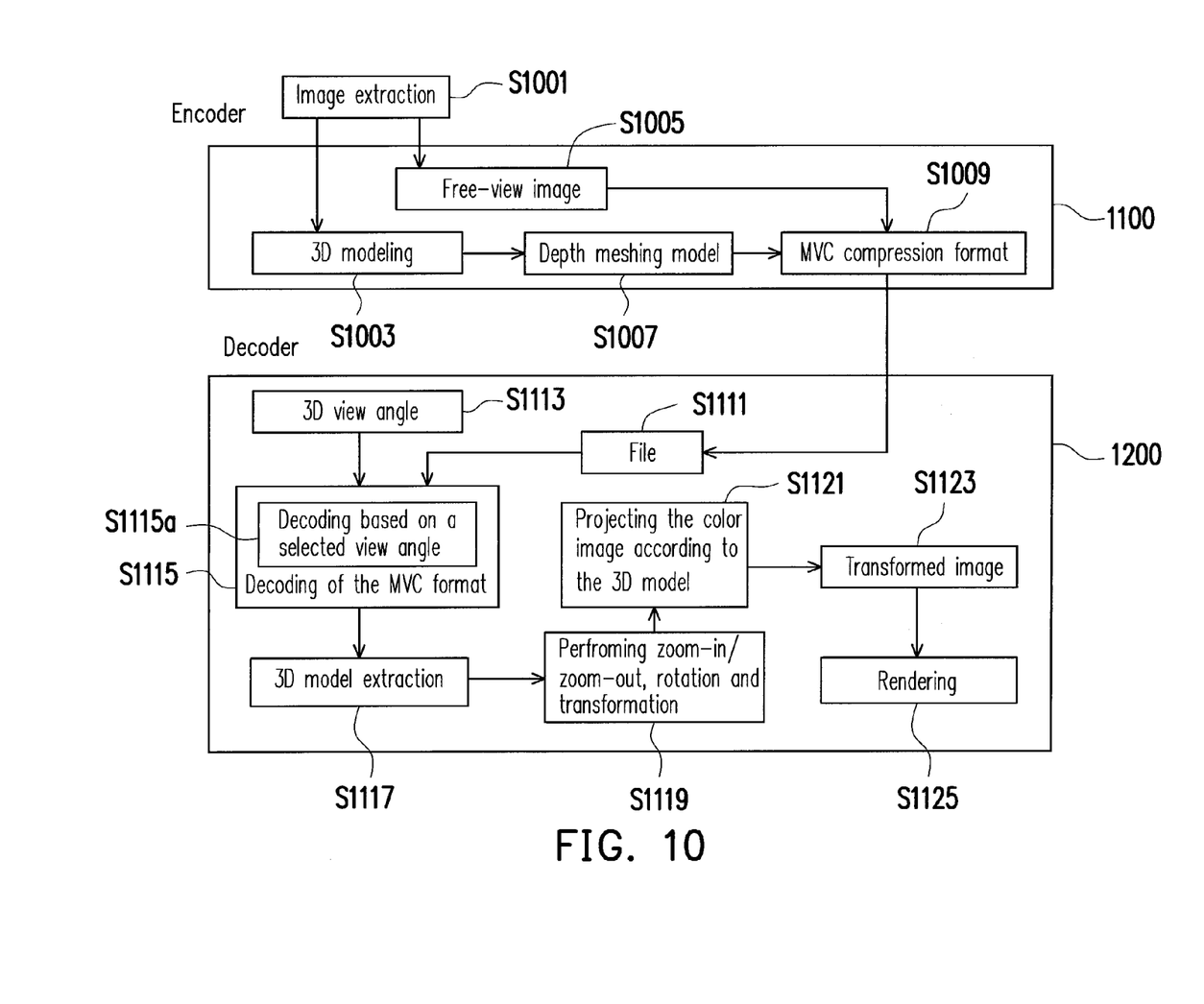
FIG. 10 is a schematic diagram illustrating flows of an image from input to display according to an exemplary example of the present disclosure.

FIG. 10 is a schematic diagram illustrating flows of an image from input to display according to an exemplary example of the present disclosure, and the flow may be implemented by the host system 1000 of FIG. 1 or the rewritable non-volatile storage medium 800 of FIG. 8. In step S1001, depth image data and color image data of an object to be reconstructed are extracted. In the embodiment of the present disclosure, a format of H.264/MVC standard is adopted, but the present disclosure is not limited thereto. This compression format divides an input image data into depth information and color information. The depth information of the depth image data is obtained by constructing a 3D model for an input image in step S1003 and generating a depth meshing model in step S1007. The color information of the color image data is obtained by generating a free-view image in step S1005. Further, in step S1009, the depth information of the depth meshing model and the color information of the free-view image are compressed into the format of H.264/MVC standard. Aforesaid flows may be implemented, partially or completely, by the microprocessor 160 of FIG. 1 or the microprocessor 850 of FIG. 8.

Referring back to FIG. 10, when generating a 3D image for display, the graphic processing apparatus 120 of FIG. 1 or the software module of FIG. 8 may perform a view synthesis according to a file S1111 being compressed and a 3D view angle estimation S1113. Among them, step S1113 is the 3D view angle estimation, which estimates statuses of the 3D model (e.g., rotation, zoom-in, zoom-out, etc.) that users may intend to observe. Next, in step S1115, the modeling method of the present disclosure is used for decoding based on a view angle of the image selected by users. In step S1115, step S1115a is first executed to decode the MVC format image into a format that is readable by the system or the software module. In step S1117, a 3D model generated after being decoded in step S1115 is extracted. In step S1119, operations corresponding to step S1113 (e.g., zoom-in, zoom-out, rotation or transformation by users) are executed on the 3D model generated from step S1115. Next, in step S1121, the color image data is projected onto the 3D model for a surface reconstruction. In step S1123, a transformed 3D model image is obtained. Then, in step S1125, the converted 3D model image is rendered and outputted for showing to users by the input/output device.

In addition, a non-transitory computer readable recording medium with a program stored therein is proposed according to an embodiment of the present disclosure. After the program is loaded into a computer and is executed, the methods described in the foregoing embodiments may be completed accordingly.

In summary, the present disclosure provides exemplary examples of the depth information-based modeling method, the graphic processing apparatus and the non-volatile storage medium.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

It will be apparent to those skilled in the art that various modifications and variations can be made to the disclosed embodiments. It is intended that the specification and examples be considered as exemplary only, with a true scope of the disclosure being indicated by the following claims and their equivalents.

The invention claimed is:

1. A depth information-based modeling method, adapted to a graphic processing apparatus, the method comprising:
   receiving depth image data and color image data, wherein the depth image data comprises a plurality of depth information, and the color image data comprises a plurality of color information;
   obtaining a plurality of three-dimensional (3D) grids by a plurality of uniform sampling grids according to the depth information of the depth image data and the color information of the color image data, wherein each of the plurality of uniform sampling grids is further divided into a plurality of sub-grids;
   determining at least one point on edges of each of the 3D grids according to the depth information of the depth image data corresponding to each of the edges of the 3D grids; and
   generating at least two triangle meshes for each of the 3D grids according to the points,
   wherein each of the plurality of color information is corresponding to one of the plurality of sub-grids of each of the plurality of uniform sampling grids,
   wherein a variance of a region of interest of each of the sub-grids is determined by the corresponding color information, and if the variance of the region of interest is greater than a threshold, the corresponding sub-grids are further divided until the variance of the region of interest variance of each of the sub-grids is lower than the threshold.

2. The depth information-based modeling method of claim 1, wherein the plurality of sub-grids has varying sizes.

3. The depth information-based modeling method of claim 1, wherein among the points on the edges of each of the 3D grids, a line is connected from the first point having the largest depth information to the second point having the second largest depth information or a plurality of vertices on the 3D grid to generate the triangle meshes.

4. A graphic processing apparatus, comprising:
   an executive circuit and a temporary storage device, wherein the temporary storage device is configured to store depth image data and color image data, wherein the depth image data comprises a plurality of depth information, the color image data comprises a plurality of color information, and the executive circuit is configured to
   obtain a plurality of three-dimensional (3D) grids by a plurality of uniform sampling grids according to the depth information of the depth image data and the color information of the color image data stored in the temporary storage device, wherein each of the plurality of uniform sampling grids is further divided into a plurality of sub-grids, at least one point on edges of each of the 3D grids is determined according to the depth information of the depth image data corresponding to each of the edges of the 3D grids, and at least two triangle meshes are generated for each of the 3D grids according to the points,
   wherein each of the color information is corresponding to one of the plurality of sub-grids of each of the plurality of uniform sampling grids,
   wherein a variance of a region of interest of each of the sub-grids is determined by the corresponding color information, and if the variance of the region of interest is greater than a threshold, the corresponding sub-grids are further divided until the variance of the region of interest of each of the sub-grids is lower than the threshold.

5. The graphic processing apparatus of claim 4, wherein the depth information of the depth image data is compatible with a multiview video coding (MVC) compression standard.

6. The graphic processing apparatus of claim 4, wherein the sub-grids have varying sizes.

7. The graphic processing apparatus of claim 4, wherein among the points on the edges of each of the 3D grids, a line is connected from the first point having the largest one of the depth information to the second point having the second largest one of the depth information or a plurality of vertices on the 3D grid in order to generate the triangle meshes.

8. The graphic processing apparatus of claim 4, wherein the executive circuit is a processing unit.

9. The graphic processing apparatus of claim 4, wherein the executive circuit is an integrated circuit.

10. A non-transitory computer readable recording medium, stored with a program therein, and capable of completing the depth information-based modeling method of claim 1 after the program is loaded into a computer and is executed.

* * * * *